(12) United States Patent
Aotani et al.

(10) Patent No.: US 9,862,845 B2
(45) Date of Patent: Jan. 9, 2018

(54) INK, INK CARTRIDGE, AND IMAGE RECORDING METHOD

(71) Applicant: CANON KABUSHIKI KAISHA, Tokyo (JP)

(72) Inventors: Takaharu Aotani, Tokyo (JP); Masahiro Terada, Hadano (JP); Hidetaka Kawamura, Yokohama (JP); Akihiro Taya, Yokohama (JP); Yohei Masada, Tokyo (JP); Masanobu Ootsuka, Tokyo (JP); Shoji Koike, Yokohama (JP); Yutaka Yoshimasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/281,138

(22) Filed: Sep. 30, 2016

(65) Prior Publication Data

US 2017/0210917 A1 Jul. 27, 2017

(30) Foreign Application Priority Data

Jan. 22, 2016 (JP) .................................. 2016-010898

(51) Int. Cl.
*C09D 11/107* (2014.01)
*C09D 11/037* (2014.01)
(Continued)

(52) U.S. Cl.
CPC .......... *C09D 11/037* (2013.01); *C09D 11/033* (2013.01); *C09D 11/107* (2013.01);
(Continued)

(58) Field of Classification Search
USPC ......................................... 524/556; 523/160
See application file for complete search history.

(56) References Cited

U.S. PATENT DOCUMENTS

| 4,557,761 A | 12/1985 | Kobayashi et al. |
| 4,632,703 A | 12/1986 | Koike et al. |

(Continued)

FOREIGN PATENT DOCUMENTS

| EP | 2 662 423 A1 | 11/2013 |
| EP | 2 692 537 A1 | 2/2014 |

(Continued)

OTHER PUBLICATIONS

US 5,123,959, 06/1992, Fukushima et al. (withdrawn)
Nov. 23, 2016 European Search Report in European Patent Appln. No. 16191786.9.

*Primary Examiner* — Vu A Nguyen
(74) *Attorney, Agent, or Firm* — Fitzpatrick, Cella, Harper & Scinto (57) ABSTRACT

An ink including a self-dispersible pigment, acrylic resin particles, a water-soluble organic solvent, and water. The self-dispersible pigment includes a phosphonic-acid-based self-dispersible pigment having a phosphonic acid group bonded directly or via another atomic group to a surface of particles of the pigment. The acrylic resin particles are formed of an acrylic resin containing a constituent unit derived from an ester-bond-containing monomer. The content of the constituent unit derived from the ester-bond-containing monomer in the acrylic resin is 60 mol % or more based on the total of the acrylic resin.

14 Claims, 1 Drawing Sheet

(51) Int. Cl.
  *C09D 11/033* (2014.01)
  *C09D 11/322* (2014.01)
  *C09D 11/324* (2014.01)
  *C09D 11/38* (2014.01)

(52) U.S. Cl.
  CPC .......... *C09D 11/322* (2013.01); *C09D 11/324* (2013.01); *C09D 11/38* (2013.01)

(56) References Cited

U.S. PATENT DOCUMENTS

| | | |
|---|---|---|
| 4,661,158 A | 4/1987 | Kobayashi et al. |
| 4,689,078 A | 8/1987 | Koike et al. |
| 4,702,742 A | 10/1987 | Iwata et al. |
| 4,725,849 A | 2/1988 | Koike et al. |
| 4,838,938 A | 6/1989 | Tomida et al. |
| 4,849,770 A | 7/1989 | Koike et al. |
| 4,853,036 A | 8/1989 | Koike et al. |
| 4,923,515 A | 5/1990 | Koike et al. |
| 4,957,553 A | 9/1990 | Koike et al. |
| 4,965,609 A | 10/1990 | Tomida et al. |
| 4,965,612 A | 10/1990 | Sakaki et al. |
| 4,969,951 A | 11/1990 | Koike et al. |
| 4,973,499 A | 11/1990 | Iwata et al. |
| 4,986,850 A | 1/1991 | Iwata et al. |
| 5,017,227 A | 5/1991 | Koike et al. |
| 5,053,078 A | 10/1991 | Koike et al. |
| 5,067,980 A | 11/1991 | Koike et al. |
| 5,075,699 A | 12/1991 | Koike et al. |
| 5,099,255 A | 3/1992 | Koike et al. |
| 5,101,217 A | 3/1992 | Iwata et al. |
| 5,118,351 A | 6/1992 | Shirota et al. |
| 5,124,718 A | 6/1992 | Koike et al. |
| 5,141,558 A | 8/1992 | Shirota et al. |
| 5,151,128 A | 9/1992 | Fukushima et al. |
| 5,190,581 A | 3/1993 | Fukushima et al. |
| 5,220,347 A | 6/1993 | Fukushima et al. |
| 5,221,333 A | 6/1993 | Shirota et al. |
| 5,248,991 A | 9/1993 | Shirota et al. |
| 5,250,121 A | 10/1993 | Yamamoto et al. |
| 5,254,157 A | 10/1993 | Koike et al. |
| 5,257,036 A | 10/1993 | Koike et al. |
| 5,258,066 A | 11/1993 | Kobayashi et al. |
| 5,296,022 A | 3/1994 | Kobayashi et al. |
| 5,329,305 A | 7/1994 | Fukushima et al. |
| 5,358,558 A | 10/1994 | Yamamoto et al. |
| 5,380,358 A | 1/1995 | Aoki et al. |
| 5,396,275 A | 3/1995 | Koike et al. |
| 5,468,553 A | 11/1995 | Koike et al. |
| 5,494,733 A | 2/1996 | Koike et al. |
| 5,500,023 A | 3/1996 | Koike et al. |
| 5,515,093 A | 5/1996 | Haruta et al. |
| 5,540,764 A | 7/1996 | Haruta et al. |
| 5,594,485 A | 1/1997 | Koike et al. |
| 5,645,631 A | 7/1997 | Koike et al. |
| 5,658,376 A | 8/1997 | Noguchi et al. |
| 5,686,951 A | 11/1997 | Koike et al. |
| 5,698,478 A | 12/1997 | Yamamoto et al. |
| 5,718,793 A | 2/1998 | Inamoto et al. |
| 5,764,261 A | 6/1998 | Koike et al. |
| 5,781,216 A | 7/1998 | Haruta et al. |
| 5,782,967 A | 7/1998 | Shirota et al. |
| 5,902,387 A | 5/1999 | Suzuki et al. |
| 5,922,625 A | 7/1999 | Haruta et al. |
| 6,033,066 A | 3/2000 | Koike et al. |
| 6,036,307 A | 3/2000 | Hakamada et al. |
| 6,139,939 A | 10/2000 | Haruta et al. |
| 6,214,963 B1 | 4/2001 | Noguchi et al. |
| 6,394,597 B1 | 5/2002 | Koike et al. |
| 6,398,355 B1 | 6/2002 | Shirota et al. |
| 6,426,766 B1 | 7/2002 | Shirota et al. |
| 6,474,803 B2 | 11/2002 | Shirota et al. |
| 6,552,156 B2 | 4/2003 | Noguchi et al. |
| 6,613,821 B2 | 9/2003 | Suzuki et al. |
| 6,619,791 B2 | 9/2003 | Tochihara et al. |
| 6,676,254 B2 | 1/2004 | Nagashima et al. |
| 6,698,876 B2 | 3/2004 | Sato et al. |
| 6,723,137 B1 | 4/2004 | Hakamada et al. |
| 6,874,881 B2 | 4/2005 | Suzuki et al. |
| 6,932,467 B2 | 8/2005 | Kawamura |
| 7,029,109 B2 | 4/2006 | Shirota et al. |
| 7,055,943 B2 | 6/2006 | Suzuki et al. |
| 7,141,105 B2 | 11/2006 | Udagawa et al. |
| 7,144,449 B2 | 12/2006 | Udagawa et al. |
| 7,185,978 B2 | 3/2007 | Nagashima et al. |
| 7,306,664 B2 | 12/2007 | Kato et al. |
| 7,429,291 B2 | 9/2008 | Udagawa et al. |
| 7,449,056 B2 | 11/2008 | Kato et al. |
| 7,464,965 B2 | 12/2008 | Udagawa et al. |
| 7,605,124 B2 | 10/2009 | Masada et al. |
| 7,611,570 B2 | 11/2009 | Koike et al. |
| 7,641,723 B2 | 1/2010 | Koike et al. |
| 7,827,982 B2 | 11/2010 | Masada et al. |
| 7,926,931 B2 | 4/2011 | Katsuragi et al. |
| 8,029,609 B2 | 10/2011 | Masada et al. |
| 8,308,198 B2 | 11/2012 | Udagawa et al. |
| 8,328,341 B2 | 12/2012 | Koike et al. |
| 8,328,926 B2 | 12/2012 | Koike et al. |
| 8,408,691 B2 | 4/2013 | Koike et al. |
| 8,506,067 B2 | 8/2013 | Koike et al. |
| 9,452,608 B2 | 9/2016 | Okamura et al. |
| 2007/0221215 A1 | 9/2007 | Sugita et al. |
| 2012/0308786 A1* | 12/2012 | Shioda ................ C09D 11/322 428/195.1 |
| 2013/0222462 A1 | 8/2013 | Okubo et al. |
| 2013/0300804 A1 | 11/2013 | Okamura et al. |
| 2014/0055520 A1 | 2/2014 | Inumaru et al. |
| 2014/0313265 A1 | 10/2014 | Himura et al. |

FOREIGN PATENT DOCUMENTS

| | | | |
|---|---|---|---|
| EP | 2692537 A1 * | 2/2014 | .......... B41M 5/0023 |
| EP | 2 862 907 A1 | 4/2015 | |
| JP | 2013-253235 A | 12/2013 | |

* cited by examiner

INK, INK CARTRIDGE, AND IMAGE RECORDING METHOD

BACKGROUND OF THE INVENTION

Field of the Invention

The present invention relates to an ink, an ink cartridge, and an image recording method.

Description of the Related Art

An inkjet recording method is one of the image recording methods that have been significantly developing in recent years because a high-quality color image can be easily recorded by the method despite its simple principle. In addition, the method has rapidly become widespread not only in the image recording of a document, a photograph, and the like in households, which has heretofore been mainstream, but also in offices and industrial applications.

Incidentally, in a related-art image recording method, an ink containing a self-dispersible pigment as a coloring material has been used for the purpose of increasing the optical density of an image to be recorded. However, the ink containing the self-dispersible pigment has involved a problem in that the fastness properties of the image, such as rubfastness, are low, though the optical density of the image is relatively high. In view of the foregoing, there has been proposed an ink in which a polyurethane resin is mixed with a view to recording an image excellent in fastness properties while containing, as a coloring material, a self-dispersible pigment having bonded thereto a hydrophilic group, such as a phosphonic acid group (Japanese Patent Application Laid-Open No. 2013-253235).

SUMMARY OF THE INVENTION

The present invention is directed to provide an ink that can record an image excellent in color developability and rubfastness, and can record an image excellent in color developability even after high-temperature storage. The present invention is also directed to provide an ink cartridge and an image recording method using the ink.

According to one embodiment of the present invention, there is provided an ink including a self-dispersible pigment, acrylic resin particles, a water-soluble organic solvent, and water, in which the self-dispersible pigment includes a phosphonic-acid-based self-dispersible pigment having a phosphonic acid group bonded directly or via another atomic group to a surface of particles of the pigment; the acrylic resin particles are formed of an acrylic resin containing a constituent unit derived from an ester-bond-containing monomer; and a content of the constituent unit derived from the ester-bond-containing monomer in the acrylic resin is 60 mol % or more based on the total of the acrylic resin.

According to another embodiment of the present invention, there is provided an ink cartridge, including an ink and an ink storage portion configured to store the ink, the ink including the above-mentioned ink.

According to still another embodiment of the present invention, there is provided an image recording method, including an ink-applying step of applying an ink to a recording medium, the ink including the above-mentioned ink.

Further features of the present invention will become apparent from the following description of exemplary embodiments with reference to the attached drawings.

DESCRIPTION OF THE EMBODIMENTS

The inventors of the present invention have made an investigation, and as a result, have found that the use of the ink proposed in Japanese Patent Application Laid-Open No. 2013-253235 can record an image having satisfactory color developability and rubfastness. However, the inventors have also found that when the ink proposed in Japanese Patent Application Laid-Open No. 2013-253235 is stored at a high temperature of, for example, about 60° C. for a certain time period, the color developability of an image to be recorded remarkably reduces.

The inventors of the present invention have made extensive investigations with a view to providing an ink that can record an image excellent in color developability and rubfastness, and can record an image excellent in color developability even after high-temperature storage, and as a result, have achieved the present invention.

An embodiment of the present invention is described below, but the present invention is not limited to the following embodiment. Various physical property values herein are values at normal temperature (25° C.) unless otherwise stated. The inventors of the present invention have made an investigation on the reason why when an ink containing, as a coloring material, a self-dispersible pigment (phosphonic-acid-based self-dispersible pigment) having a phosphonic acid group bonded directly or via another atomic group to the surface of a pigment particle is stored under a high-temperature condition, the color developability of an image to be recorded reduces. As a result, the inventors have found that a modifying group containing the phosphonic acid group bonded to the surface of the pigment particle is dissociated or eliminated during the high-temperature storage. Accordingly, the modifying group containing the phosphonic acid group is bonded to a cationic species produced from an organic salt or an inorganic salt abundantly present in a recording medium to lose its charge, and hence the pigment aggregates on the surface layer of the recording medium to fix. Thus, high color developability is exhibited. However, when the ink is stored at high temperature, the modifying group is dissociated or eliminated, and hence is not bonded to the cationic species. Accordingly, the pigment hardly aggregates. Probably as a result of the foregoing, the pigment is liable to permeate into the recording medium and hence the color developability of the image reduces.

As a result of a further investigation, the inventors of the present invention have found that when the phosphonic-acid-based self-dispersible pigment and acrylic resin particles containing a constituent unit derived from an ester-bond-containing monomer are caused to coexist, the ink can record an image excellent in color developability even after high-temperature storage. The reason why such effect is obtained is unclear. However, the inventors of the present invention have assumed the reason to be as described below. An ester bond portion in an acrylic resin constituting the acrylic resin particles specifically or nonspecifically protects the modifying group containing the phosphonic acid group, and hence even when the ink is stored at high temperature, the dissociation and elimination of the modifying group are suppressed. When constituent materials for the ink synergistically act on each other as described above, the ink can record an image excellent in color developability and rubfastness, and can record an image excellent in color developability even after high-temperature storage.

<Ink>

The ink of the present invention contains a self-dispersible pigment, acrylic resin particles, a water-soluble organic solvent, and water. The ink is suitable for an inkjet ink. The components constituting the ink of the present invention, the physical properties of the ink, and the like are described in detail below.

Self-Dispersible Pigment

The ink of the present invention contains a phosphonic-acid-based self-dispersible pigment having a phosphonic acid group bonded directly or via another atomic group to the surface of particles of the pigment. With regard to the form of the phosphonic acid groups in the ink, the groups may be in a state in which part of the groups are dissociated, or may be in a state in which all of the groups are dissociated.

The content (mass %) of the self-dispersible pigment in the ink is preferably 0.1 mass % or more to 15.0 mass % or less based on the total mass of the ink. In addition, the content is more preferably 0.1 mass % or more to 8.0 mass % or less, particularly preferably 3.0 mass % or more to 6.0 mass % or less. When the content of the self-dispersible pigment falls within this range, the color developability of an image to be recorded and the ejection stability of the ink can be further improved. In addition, the 50% cumulative volume-average particle diameter ($D_{50}$) of the self-dispersible pigment is preferably 50 nm or more to 200 nm or less.

Phosphonic Acid Group

The phosphonic acid group is bonded directly or via another atomic group (—R—) to the surface of pigment particles. Examples of the phosphonic acid group may include groups represented by —$PO_3HM$ and —$PO_3M_2$. In the formulae, "M" preferably represents a hydrogen atom, an alkali metal, ammonium, or an organic ammonium. Of those, a group having a structure represented by —CQ($PO_3M_2$)$_2$ is preferred as the phosphonic acid group. In the formula, "Q" represents R', OR', SR', or NR'$_2$. "R'"s each independently represent a hydrogen atom, an alkyl group, an acyl group, an aralkyl group, or an aryl group. Examples of the alkyl group may include a methyl group and an ethyl group. Examples of the acyl group may include an acetyl group and a benzoyl group. The aralkyl group may be, for example, a benzyl group. Examples of the aryl group may include a phenyl group and a naphthyl group. Of those, a group having a structure represented by —CH($PO_3M_2$)$_2$ is particularly preferred.

Examples of said another atomic group (—R—) may include an amide group, an amino group, a ketone group, an ester group, an ether group, an alkylene group having 1 to 12 carbon atoms, a phenylene group, a substituted phenylene group, a naphthylene group, and a substituted naphthylene group. Of those, a group containing —$C_6H_4$—CONH— (benzamide structure) or —$C_6H_4$—$SO_2NH$— (benzenesulfonamide structure) is preferred as said another atomic group (—R—). A plurality of phosphonic acid groups may be bonded to a carbon atom of said another atomic group (—R—). Specifically, a self-dispersible pigment in which an atomic group having bonded thereto a bisphosphonic acid group or a triphosphonic acid group is bonded to the surface of a pigment particle is preferably used because both the fastness properties of an image recorded after long-term storage of the ink and the dispersion stability of the pigment can be achieved.

Kind of Pigment

Examples of the kind of the pigment constituting the self-dispersible pigment may include an inorganic pigment and an organic pigment, and any one of the known pigments that may be used in inks may be used.

Examples of the inorganic pigment may include furnace black, acetylene black, channel black, thermal black, and lamp black. More specifically, commercial carbon blacks as described below may be used. Examples thereof may include carbon blacks available under the following trade names: RAVEN: 7000, 5750, 5250, 5000 ULTRA, 3500, 2000, 1500, 1255, 1250, 1200, 1190 ULTRA-II, and 1170 (manufactured by Columbia Carbon Co., Ltd.); MONARCH: 700, 800, 880, 900, 1000, 1100, 1300, 1400, and 2000 (manufactured by Cabot); BLACK PEARLS: 880, 800, and L (manufactured by Cabot); COLOR BLACK: FW1, FW2, FW2V, FW18, FW200, 5150, 5160, and 5170 (manufactured by Degussa); PRINTEX: 85, 95, 140U, 140V, U, and V (manufactured by Degussa); SPECIAL BLACK: 6, 5, 4A, and 4 (manufactured by Degussa); and No. 900, No. 1000, No. 2200B, No. 2300, No. 2350, No. 2400R, and MCF-88 (manufactured by Mitsubishi Chemical Corporation). Newly prepared carbon black may also be used. Further, commercial phosphonic-acid-based self-dispersible carbon black may be, for example, a product available under the trade name "CAB-O-JET 400" (manufactured by Cabot).

A cyan pigment, a magenta pigment, a yellow pigment, or the like may be used as the organic pigment. A copper phthalocyanine pigment is preferably used as the cyan pigment. Specific examples of the copper phthalocyanine pigment may include C.I. Pigment Blue 1, 2, 3, 15, 15:2, 15:3, 15:4, 16, 22, and 60. Further, a commercial phosphonic-acid-based self-dispersible cyan pigment may be, for example, a product available under the trade name "CAB-O-JET 450C" (manufactured by Cabot).

A quinacridone pigment is preferably used as the magenta pigment. Specific examples of the quinacridone pigment may include: C.I. Pigment Red 5, 7, 12, 48, 48:1, 57, 112, 122, 123, 146, 168, 184, 202, and 207; and C.I. Pigment Violet 19. Further, a commercial phosphonic-acid-based self-dispersible magenta pigment may be, for example, a product available under the trade name "CAB-O-JET 465M" or "CAB-O-JET 480V" (manufactured by Cabot).

An azo pigment is preferably used as the yellow pigment. Specific examples of the azo pigment may include C.I. Pigment Yellow 12, 13, 14, 16, 17, 74, 83, 93, 95, 97, 98, 114, 128, 129, 151, and 154. Further, a commercial phosphonic-acid-based self-dispersible yellow pigment may be, for example, a product available under the trade name "CAB-O-JET 470Y" (manufactured by Cabot).

Method of Analyzing Pigment

The following method may be given as an analysis method for verification as to whether or not the pigment in the ink is a self-dispersible pigment. First, the ink is subjected to acid precipitation and then centrifuged, followed by the collection of a precipitate. When the sample is a pigment dispersion, the pigment dispersion is subjected to acid precipitation and then a precipitate is collected. Next, the collected precipitate is loaded into a dish and water is poured into the dish, followed by stirring to redisperse the precipitate. After the resultant has been left to stand for 1 day, when the pigment is dispersed without the occurrence of any precipitate in the dish, the pigment can be judged to be a self-dispersible pigment.

Whether or not the self-dispersible pigment in the ink has a phosphonic acid group may be verified by analysis with an ICP emission spectrometer. Specifically, analysis is performed with the ICP emission spectrometer, and when the presence of a phosphorus element is confirmed, the self-dispersible pigment can be judged to have a phosphonic acid group.

Acrylic Resin Particles

The ink of the present invention contains acrylic resin particles (hereinafter sometimes simply described as "resin particles"). The term "acrylic resin particles" as used in the present invention means "particles formed of an acrylic resin that can be present in a dispersed state in an aqueous medium." When not the resin particles but a water-soluble acrylic resin that cannot be present in a particle state in the ink is incorporated, the water-soluble acrylic resin adsorbs to the surface of a recording medium to exhibit a surfactant action. Accordingly, the permeation of the pigment in the depth direction of the recording medium is accelerated, and hence the color developability of an image to be recorded reduces.

The content of the resin particles in the ink is preferably 0.1 mass % or more to 10.0 mass % or less based on the total mass of the ink. When the content of the resin particles falls within the range, the rubfastness of an image and the ejection stability of the ink can be further improved.

The 50% cumulative volume-average particle diameter ($D_{50}$) of the resin particles is preferably 1 nm or more to 200 nm or less, more preferably 10 nm or more to 200 nm or less. In addition, the 50% cumulative volume-average particle diameter is particularly preferably 180 nm or less, most preferably 150 nm or less. The average particle diameter ($D_{50}$) of the resin particles may be measured by a method involving utilizing the scattering of laser light. Specifically, the average particle diameter may be measured with an apparatus, such as a product available under the trade name "FPAR-1000" (manufactured by Otsuka Electronics Co., Ltd., analysis by a cumulant method) or a product available under the trade name "NANOTRAC UPA-150EX" (manufactured by Nikkiso Co., Ltd., a 50% cumulative value is adopted). The average particle diameter of the resin particles in the present invention is a physical property value defined by a scattering average particle diameter, and may be determined by a dynamic light scattering method in a liquid.

The weight-average molecular weight of the resin particles may be measured with a polystyrene standard sample by gel permeation chromatography (GPC). For example, those described below may be used as a GPC apparatus and the like. In addition, a product available under the trade name "PS-1" or "PS-2" (manufactured by Polymer Laboratories) may be used as the polystyrene standard sample.
Apparatus: Alliance GPC 2695 (manufactured by Waters)
Column: Four continuous columns of Shodex KF-806M (manufactured by Showa Denko K.K.)
Detector: Refractive index (RI) detector A monomer to be used for obtaining the acrylic resin constituting the acrylic resin particles may be, for example, a (meth)acrylic monomer. Specific examples of the (meth) acrylic monomer may include: monomers having an ester bond, such as methyl (meth)acrylate, ethyl (meth)acrylate, propyl (meth)acrylate, butyl (meth)acrylate, hexyl (meth) acrylate, octyl (meth)acrylate, lauryl (meth)acrylate, and stearyl (meth)acrylate; and (meth)acrylic acids, such as acrylic acid and methacrylic acid. The acrylic resin may be a homopolymer of (meth)acrylic monomers, or may be a copolymer of (meth)acrylic monomers with other monomers. Examples of the other monomers may include vinyl esters, olefins, styrenes, crotonic acids, itaconic acids, maleic acids, fumaric acids, acrylamides, allyl compounds, vinyl ethers, vinyl ketones, glycidyl esters, and unsaturated nitriles.

The acrylic resin constituting the resin particles to be used in the ink of the present invention contains a constituent unit derived from an ester-bond-containing monomer. The ester-bond-containing monomer is preferably at least one of an acrylic acid ester or a methacrylic acid ester. In addition, the content of the constituent unit derived from the ester-bond-containing monomer in the acrylic resin is 60 mol % or more, preferably 70 mol % or more to 100 mol % or less, more preferably 80 mol % or more to 100 mol % or less based on the total of the acrylic resin. Setting the content of the constituent unit derived from the ester-bond-containing monomer in the acrylic resin to 60 mol % or more can provide an ink that can record an image excellent in color developability even after high-temperature storage.

Method of Producing Acrylic Resin Particles

An example of a method of producing the acrylic resin particles to be used in the ink of the present invention is described below. A predetermined amount of a monomer and 100 g of distilled water serving as a solvent are fed into a 300-milliliter four-necked flask. A stirring seal, a stirring rod, a reflux condenser, a septum rubber, and a nitrogen-introducing tube are mounted to the flask, and in a thermostat bath at 70° C., the flask is purged with nitrogen for 1 hour while the contents are stirred at 300 rpm. Then, a polymerization initiator dissolved in 100 g of distilled water is injected into the flask with a syringe to initiate polymerization. The polymerization status is monitored by gel permeation chromatography (GPC) and NMR. Thus, a desired polymerization reaction product (acrylic resin) is obtained. The produced acrylic resin is centrifuged and redispersed in distilled water. The centrifuging and redispersing step is repeated. Thus, a water dispersion of a purified acrylic resin can be obtained. The purified acrylic resin may be concentrated through the use of, for example, an evaporator or ultrafiltration as required.

A polymerization initiator used in a general radical polymerization method may be used as the polymerization initiator. Examples of the polymerization initiator may include potassium persulfate and 2,2'-azobis(2-amidinopropane) dihydrochloride. In addition to the polymerization initiator, an emulsifying agent, such as a surfactant, a chain transfer agent, a neutralizer, or the like may be used in accordance with an ordinary method. Ammonia or a hydroxide of an inorganic alkali (e.g., sodium hydroxide or potassium hydroxide) is preferred as the neutralizer. For example, an anionic surfactant, such as sodium lauryl sulfate, a nonionic surfactant, or an amphoteric surfactant may be used as the emulsifying agent. Examples of the chain transfer agent may include t-dodecyl mercaptan, n-dodecyl mercaptan, n-octyl mercaptan, xanthogens, such as dimethyl xanthogen disulfide and diisobutyl xanthogen disulfide, dipentene, indene, 1,4-cyclohexadiene, dihydrofuran, and xanthene.

Surfactant

The ink of the present invention preferably further contains a surfactant. The incorporation of the surfactant can further improve the ejection stability of the ink and the easiness of spreading of ink dots on a recording medium. Any one of the conventionally known surfactants may be used as the surfactant. Of those, a nonionic surfactant is preferred. Of the nonionic surfactants, ethylene oxide adducts, such as a polyoxyethylene alkyl ether and an acetylene glycol, are preferred. Further, the surfactant is preferably a surfactant represented by the following general formula (1). Specific examples of the surfactant represented by the general formula (1) may include products available under the trade names "ACETYLENOL" (manufactured by Kawaken Fine Chemicals Co., Ltd.), "Surfynol" (manufactured by Air Products and Chemicals, Inc.), and "Dynol 604," "Dynol 607," "Dynol 800," and "Dynol 810" (manufactured by Air Products and Chemicals, Inc.).

(1)

(In the general formula (1), $R_1$ to $R_4$ each independently represent an alkyl group having 1 to 3 carbon atoms, x and y each independently represent a number of from 1 to 5, and m+n represents a number of from 0 to 10.)

In the general formula (1), $R_1$ to $R_4$ preferably represent a methyl group. x and y preferably each independently represent a number of from 1 to 2. m and n preferably each independently represent a number of from 0 to 7, and m+n preferably represents a number of from 2 to 5. In addition, m+n preferably represents a number of 8 or less, and more preferably represents a number of 5 or less. Further, it is preferred that x=y=2.

The content (mass %) of the surfactant in the ink is preferably 0.1 mass % or more to 3.0 mass % or less, more preferably 0.5 mass % or more to 1.5 mass % or less based on the total mass of the ink. When the content of the surfactant falls within this range, the ejection stability of the ink and the easiness of spreading of ink dots on a recording medium can be further improved. In addition, any other surfactant except the surfactant represented by the general formula (1) may be further incorporated into the ink. Examples of the other surfactant may include an acetylene glycol and a nonionic surfactant obtained by adding ethylene oxide to an acetylene glycol.

Water

The ink of the present invention is an aqueous ink containing water. Deionized water (ion-exchanged water) is preferably used as the water. The content of the water in the ink is preferably 50 mass % or more to 90 mass % or less based on the total mass of the ink.

Water-Soluble Organic Solvent

The ink of the present invention contains a water-soluble organic solvent. The term "water-soluble organic solvent" as used in the present invention means an "organic solvent having a solubility in water at 20° C. of 500 g/L or more." Any one of the known water-soluble organic solvents that may be used in inks may be used as the water-soluble organic solvent. Specific examples of the water-soluble organic solvent may include alcohols, glycols, alkylene glycols, polyethylene glycols, nitrogen-containing compounds, and sulfur-containing compounds. One kind of those water-soluble organic solvents may be used alone, or two or more kinds thereof may be used in combination. From the viewpoint of the adjustment of the viscosity of the ink, the ink preferably contains a polyethylene glycol and glycerin. The number-average molecular weight of the polyethylene glycol is preferably 500 or more to 1,200 or less. Further, a polyethylene glycol having a number-average molecular weight of 1,000 (the so-called "polyethylene glycol 1,000") is preferably used. When the polyethylene glycol and glycerin are used in combination, the mass ratio of the content (mass %) of the polyethylene glycol to the content (mass %) of glycerin is preferably 0.15 times or more to 0.40 times or less. The content of the water-soluble organic solvent in the ink is preferably 50 mass % or less, more preferably 5 mass % or more to 45 mass % or less based on the total mass of the ink.

Additives

The ink of the present invention may contain various additives, such as a surfactant except the above-mentioned surfactants, a pH adjustor, a corrosion inhibitor, a preservative agent, a fungicide, an antioxidant, an antireducing agent, an evaporation promoter, and a chelator, as required. An amine compound having a buffering capacity is preferably used as the pH adjustor, and N-butyldiethanolamine is more preferably used as the pH adjustor.

<Ink Cartridge>

An ink cartridge of the present invention includes an ink storage portion configured to store an ink. In addition, the ink of the present invention described above is stored in the ink storage portion. The ink storage portion may be, for example, an ink storage portion having: an ink storage chamber configured to store a liquid ink; and a negative-pressure-generating member storage chamber configured to store a negative-pressure-generating member configured to hold the ink in itself by a negative pressure. In addition, the ink cartridge may be an ink cartridge that does not include an ink storage chamber configured to store a liquid ink but includes an ink storage portion configured to hold the total amount of the ink with the negative pressure-generating member. Further, the ink cartridge may be an ink cartridge of a mode including the ink storage portion and a recording head.

<Image Recording Method>

An image recording method of the present invention includes an ink-applying step of applying the ink of the present invention described above to a recording medium. In addition, the image recording method of the present invention preferably further includes a conveying step of conveying the recording medium and a heating step of heating the recording medium having applied thereto the ink.

Figure 1:
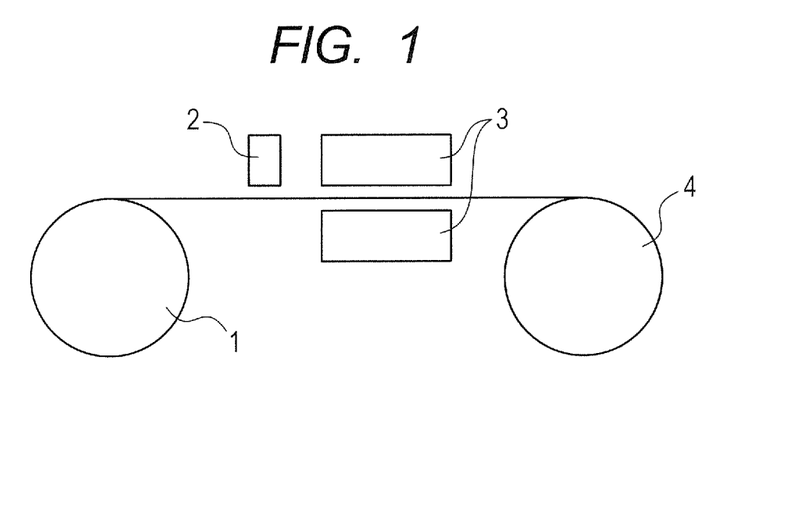
FIG. 1 is a schematic view for illustrating an example of an image recording apparatus to be used in an image recording method of the present invention.

FIG. 1 is a schematic view for illustrating an example of an image recording apparatus to be used in the image recording method of the present invention. In the form of the image recording apparatus illustrated in FIG. 1, a recording medium wound in a roll shape is used, and the recording medium having recorded thereon an image is wound in a roll shape again. Consequently, the image recording apparatus illustrated in FIG. 1 includes a recording-medium-supplying unit 1, an ink-applying unit 2, a heating unit 3, and a recording-medium-recovering unit 4. The recording-medium-supplying unit 1 is a unit for holding and supplying the recording medium wound in a roll shape. The ink-applying unit 2 is a unit for applying the ink to the recording medium fed from the recording-medium-supplying unit 1. The heating unit 3 is a unit for heating the recording medium having applied thereto the ink. In addition, the recording-medium-recovering unit 4 is a unit for winding the recording medium having applied thereto the ink and having recorded thereon an image. The recording medium is conveyed by a conveying unit including a conveying member, such as a roller pair or a belt, along a conveying path illustrated by the solid line in FIG. 1, and is treated in each unit. For example, the following treatment may be performed: the recording medium wound in a roll shape by the recording medium-recovering unit 4 is supplied to another apparatus or the like, and the recording medium is cut into a desired size or bound into a book.

The speed at which the recording medium is conveyed in the conveying step is preferably 50 m/min or more, more preferably 100 m/min or more. In addition, from the viewpoint of a drying property or the like, the ejection amount of the ink per color is preferably 1.0 mg/cm$^2$ or less, more preferably 0.8 mg/cm$^2$ or less.

A moderate tension is preferably applied to the recording medium at the time of its conveyance. In other words, the image recording apparatus preferably further includes a tension-applying unit for applying a tension to the recording medium. Specifically, it is sufficient that a tension-applying portion configured to apply a tension to the recording medium, a tension-adjusting portion configured to adjust the tension to be applied to the recording medium, and the like be arranged in the conveying path between the recording-medium-supplying unit 1 and the recording-medium-recovering unit 4. The application of the tension to the recording medium suppresses the swelling of fibers constituting the recording medium due to the water in the ink. The swelling of the fibers constituting the recording medium increases the volume of voids between the fibers to increase the permeation rate of the ink. However, when the permeation rate of the ink increases, the ink is liable to deeply permeate in a direction perpendicular to the surface of the recording medium, and hence the optical density of the image becomes insufficient in some cases. In contrast, the application of the tension to the recording medium suppresses the swelling of the fibers constituting the recording medium, and hence can suppress a reduction in optical density of the image due to an increase in permeation rate of the ink.

The tension to be applied to the recording medium is set to preferably 20 N/m or more, more preferably 30 N/m or more, particularly preferably 40 N/m or more to 100 N/m or less. The setting of the tension to be applied to the recording medium to 20 N/m or more can more efficiently suppress the swelling of the fibers constituting the recording medium due to the water in the ink.

Ink-Applying Step

The ink-applying step is the step of applying ink to the recording medium. An inkjet system is preferably adopted as a system for the application of the ink to the recording medium. Accordingly, the image recording method of the present invention is preferably an inkjet recording method. The inkjet system may be a thermal inkjet system, or may be a piezo inkjet system. The thermal inkjet system is a system involving applying thermal energy to the ink to eject the ink from an ejection orifice of a recording head. In addition, the piezo inkjet system is a system involving ejecting the ink from the ejection orifice of the recording head with a piezoelectric element. In the image recording method of the present invention, an ink containing resin particles and having a relatively high solid content concentration is used, and hence the ink is preferably applied to the recording medium by the piezo inkjet system from the viewpoint of the ejection stability of the ink.

The recording head may be a serial type recording head, or may be a full-line type recording head. The serial type recording head is a recording head configured to scan a recording medium in a direction intersecting its conveying direction to record an image. In addition, the full-line type recording head is a recording head having a plurality of nozzles arrayed in a range covering the maximum width of the recording medium. The full-line type inkjet recording head is preferably used because an image can be recorded at higher speed. The full-line type inkjet recording head is preferably a recording head having a nozzle array arranged in a direction perpendicular to the conveying direction of the recording medium. In addition, it is typically preferred that a plurality of full-line type inkjet recording heads be arranged for each ink color, and the respective recording heads be sequentially arrayed along the conveying direction of the recording medium so as to be parallel to each other.

Heating Step

The heating step is a step of performing heating so that the surface temperature of the recording medium having applied thereto the ink may be 70° C. or more. The expression "surface temperature of the recording medium having applied thereto the ink" as used in the present invention means the surface temperature of the recording medium defined as follows: when the time point at which the ink is applied to the recording medium is defined as 0 seconds, the surface temperature of the recording medium at a position distant from the application position by a distance corresponding to 0.5 second of its conveyance is take to be "surface temperature of the recording medium having applied thereto the ink". For example, it is hypothesized that the speed at which the recording medium is conveyed is "V" m/min. When such hypothesis is formed, it is determined by measuring the surface temperature of an ink application region X in the recording medium at a position distant along its conveying direction from the position at which the ink has been applied by the movement distance of the application region X, i.e., "(V×0.5)/60" m. The term "position at which the ink has been applied" in the case of the full-line type inkjet recording head means a position directly below the recording head. In Examples to be described later, the surface temperature of a recording medium was measured with a noncontact infrared thermometer digital radiation temperature sensor (trade name "FT-H20", manufactured by Keyence Corporation) from a position distant by 10 cm from the surface of the recording medium in a substantially vertical direction.

In the heating step, the heating is preferably performed so that the surface temperature of the recording medium having applied thereto the ink is 80° C. or more. In addition, from the viewpoint of the prevention of the deformation of the recording medium due to heat, the heating is preferably performed so that the surface temperature is 140° C. or less. Examples of a method of heating the recording medium may include a method involving arranging a heater to heat the recording medium from its front surface side (side on which the ink is to be applied); a method involving heating the recording medium from its rear surface side; and a method involving heating both surfaces of the recording medium.

The recording medium may be continuously heated during the time interval before and after the application of the ink. Before the application of the ink, it is preferred that the recording medium be not heated or be heated so as to have a surface temperature of less than 70° C., it is more preferred that the recording medium be heated so as to have a surface temperature of 60° C. or less, and it is particularly preferred that the recording medium be heated so as to have a surface temperature of 40° C. or less.

When the recording medium is heated, the recording medium may be pressed with, for example, a pressure roller. The pressing of the recording medium can improve the fixability of an image. When the recording medium is pressed, there is no need to perform the pressing over the entire process of the heating step, and the pressing may be performed only in part of the process of the heating step. In addition, the recording medium may be pressed in many stages, or the image recording method may further include a pressing step after the heating step.

Recording Medium

Figure 2:
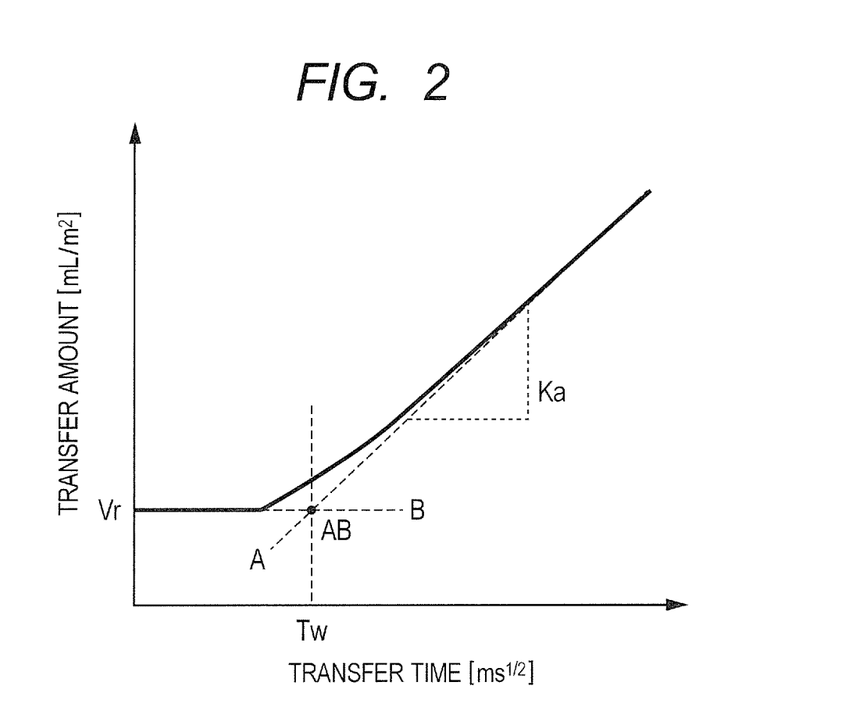
FIG. 2 is a graph for showing an example of an absorption curve describing an absorption coefficient Ka of a recording medium for water.

Any one of the recording media that have heretofore been generally used may be used as the recording medium. Of those, a recording medium having an absorption coefficient Ka for water of 0.1 mL/(m$^2$·ms$^{1/2}$) or more to 3.0 mL/(m$^2$·ms$^{1/2}$) or less is preferred, a recording medium having an absorption coefficient Ka for water of 0.2 mL/(m$^2$·ms$^{1/2}$) or more is more preferred, and a recording medium having an absorption coefficient Ka for water of 0.3 mL/(m$^2$·ms$^{1/2}$) or more is particularly preferred. The Bristow method described in the "Method of testing Paper and Paperboard for their Liquid-absorbing Properties" of JAPAN TAPPI Paper Pulp Test Method No. 51 is used as a method of deriving the absorption coefficient Ka of the recording medium for water. Although detailed description about the Bristow method is omitted because many commercial books describe the method, the absorption coefficient Ka (mL/(m$^2$·ms$^{1/2}$)) is defined by a wetting time Tw and a roughness index Vr (mL/m$^2$). FIG. 2 is a graph for showing an example of an absorption curve describing the absorption coefficient Ka of the recording medium for water. The absorption curve shown in FIG. 2 is based on the following permeation model: the permeation of a liquid into a recording medium starts after a lapse of the wetting time Tw from the contact of the liquid with the recording medium. The gradient of a straight line after a lapse of the wetting time Tw is the absorption coefficient Ka. The absorption coefficient Ka corresponds to the rate of liquid permeation into the recording medium. As shown in FIG. 2, the wetting time Tw is calculated as follows: the intersection point AB of an approximate straight line A obtained by a least-squares method for calculating the absorption coefficient Ka and a straight line B corresponding to "V=Vr" represented by a transfer amount V of the liquid and the roughness index Vr is determined, and then the wetting time is defined as the time interval from the origin to the intersection point AB. The temperature of the liquid (water) to be caused to permeate into the recording medium is set to 25° C. Accordingly, the absorption coefficient Ka for water in the present invention is the absorption coefficient Ka for water at 25° C.

The recording medium may be a recording medium cut into a desired size in advance, or may be an elongated recording medium wound in a roll shape, the recording medium being cut into a desired size after image recording. Of those, the elongated recording medium wound in a roll shape is preferably used because a tension can be easily applied thereto.

According to one aspect of the present invention, there can be provided an ink that can record an image excellent in color developability and rubfastness, and can record an image excellent in color developability even after high-temperature storage. According to another aspect of the present invention, there can be provided an ink cartridge and an image recording method using the ink.

EXAMPLES

The present invention is more specifically described below by way of Examples and Comparative Examples. The present invention is by no means limited to Examples below without departing from the gist of the present invention. "Part(s)" and "%" with regard to the description of the amounts of components are by mass, unless otherwise stated.

<Preparation of Self-Dispersible Pigment>

Pigment A (Self-Dispersible Pigment Having Bonded Thereto Bisphosphonic Acid Group)

20.0 grams of carbon black, 7.0 mmol of a sodium salt of ((4-aminobenzoylamino)-methane-1,1-diyl)bisphosphonic acid, 20.0 mmol of nitric acid, and 200.0 mL of pure water were mixed. Then, the contents were mixed with a Silverson mixer at room temperature and 6,000 rpm for 30 minutes to provide a mixture. 20.0 millimoles of sodium nitrite dissolved in a small amount of water was slowly added to the resultant mixture. The temperature of the mixture reached 60° C. as a result of the addition of sodium nitrite. The mixture was allowed to react in this state for 1 hour. After the reaction, an aqueous solution of sodium hydroxide was added to adjust the pH of the mixture to 10. 30 minutes later, 20.0 mL of pure water was added to the mixture, followed by filtration with a spectrum membrane. The counter ion of the anionic group was changed from a sodium ion to a potassium ion by subjecting the filtrate to an ion exchange treatment, and then the solid content concentration was adjusted. Thus, a pigment dispersion liquid was obtained. The resultant pigment dispersion liquid contained a self-dispersible pigment (pigment A) in which a ((4-aminobenzoylamino)-methane-1,1-diyl)bisphosphonic acid group whose counter ion was potassium was bonded to the surface of a pigment particle. The content of the pigment A in the pigment dispersion liquid was 30.0%.

Pigment B (Self-Dispersible Pigment Having Bonded Thereto Phosphonic Acid Group)

A pigment dispersion liquid was prepared in the same manner as in the case of the pigment A described above except that a sodium salt of 4-aminobenzenephosphonic acid was used instead of the sodium salt of ((4-aminobenzoylamino)-methane-1,1-diyl)bisphosphonic acid. The resultant pigment dispersion liquid contained a self-dispersible pigment (pigment B) in which a 4-aminobenzoylaminophosphonic acid group whose counter ion was potassium was bonded to the surface of a pigment particle. The content of the pigment B in the pigment dispersion liquid was 30.0%.

<Synthesis of Acrylic Resin Particles>

Acrylic Resin Particles A

Polymerization was performed in accordance with the "Method of producing Acrylic Resin Particles" by using "100 g of ethyl acrylate" as a predetermined monomer. After the polymerization, purification and concentration were performed. Thus, a dispersion liquid containing acrylic resin particles A and having a solid content concentration of 10% was obtained. The average particle diameter of the acrylic resin particles A in the resultant dispersion liquid was 80 nm.

Acrylic Resin Particles B

A dispersion liquid containing acrylic resin particles B and having a solid content concentration of 10% was obtained in the same manner as in the case of the acrylic resin particles A described in the foregoing except that "20 g of styrene and 80 g of ethyl acrylate" were used as the predetermined monomers. The average particle diameter of the acrylic resin particles B in the resultant dispersion liquid was 80 nm.

Acrylic Resin Particles C

A dispersion liquid containing acrylic resin particles C and having a solid content concentration of 10% was obtained in the same manner as in the case of the acrylic resin particles A described in the foregoing except that "20 g of styrene, 60 g of ethyl acrylate, and 14 g of acrylic acid" were used as the predetermined monomers. The average particle diameter of the acrylic resin particles C in the resultant dispersion liquid was 80 nm.

Acrylic Resin Particles D

A dispersion liquid containing acrylic resin particles D and having a solid content concentration of 10% was obtained in the same manner as in the case of the acrylic resin particles A described in the foregoing except that "100 g of ethyl methacrylate" was used as the predetermined monomer. The average particle diameter of the acrylic resin particles D in the resultant dispersion liquid was 80 nm.

Acrylic Resin Particles E

A dispersion liquid containing acrylic resin particles E and having a solid content concentration of 10% was obtained in the same manner as in the case of the acrylic resin particles A described in the foregoing except that "10 g of styrene and 57 g of n-butyl acrylate" were used as the predetermined monomers. The average particle diameter of the acrylic resin particles E in the resultant dispersion liquid was 80 nm.

Acrylic Resin Particles F

A dispersion liquid containing acrylic resin particles F and having a solid content concentration of 10% was obtained in the same manner as in the case of the acrylic resin particles A described in the foregoing except that "20 g of styrene, 85 g of n-butyl acrylate, and 17 g of methacrylic acid" were used as the predetermined monomers. The average particle diameter of the acrylic resin particles F in the resultant dispersion liquid was 80 nm.

Acrylic Resin Particles G

A dispersion liquid containing acrylic resin particles G and having a solid content concentration of 10% was obtained in the same manner as in the case of the acrylic resin particles A described in the foregoing except that "90 g of ethyl acrylate and 14 g of n-butyl acrylate" were used as the predetermined monomers. The average particle diameter of the acrylic resin particles G in the resultant dispersion liquid was 80 nm.

Acrylic Resin Particles H

A dispersion liquid containing acrylic resin particles H and having a solid content concentration of 10% was obtained in the same manner as in the case of the acrylic resin particles A described in the foregoing except that "40 g of ethyl acrylate and 60 g of n-butyl acrylate" were used as the predetermined monomers. The average particle diameter of the acrylic resin particles H in the resultant dispersion liquid was 80 nm.

Acrylic Resin Particles I

A dispersion liquid containing acrylic resin particles I and having a solid content concentration of 10% was obtained in the same manner as in the case of the acrylic resin particles A described in the foregoing except that "8 g of ethyl acrylate and 90 g of n-butyl acrylate" were used as the predetermined monomers. The average particle diameter of the acrylic resin particles I in the resultant dispersion liquid was 80 nm.

Acrylic Resin Particles J

A dispersion liquid containing acrylic resin particles J and having a solid content concentration of 10% was obtained in the same manner as in the case of the acrylic resin particles A described in the foregoing except that "12 g of styrene, 30 g of ethyl acrylate, and 35 g of n-butyl acrylate" were used as the predetermined monomers. The average particle diameter of the acrylic resin particles J in the resultant dispersion liquid was 80 nm.

Acrylic Resin Particles K

A dispersion liquid containing acrylic resin particles K and having a solid content concentration of 10% was obtained in the same manner as in the case of the acrylic resin particles A described in the foregoing except that "10 g of styrene, 40 g of ethyl acrylate, 50 g of n-butyl acrylate, and 10 g of acrylic acid" were used as the predetermined monomers. The average particle diameter of the acrylic resin particles K in the resultant dispersion liquid was 80 nm.

Acrylic Resin Particles M

A product available under the trade name "AC-2714" from Alberdingk was used as acrylic resin particles M. The average particle diameter of the acrylic resin particles M was 80 nm.

Acrylic Resin Particles N

A dispersion liquid containing acrylic resin particles N and having a solid content concentration of 10% was obtained in the same manner as in the case of the acrylic resin particles A described in the foregoing except that the number of revolutions of the stirring was changed to 500 rpm. The average particle diameter of the acrylic resin particles N in the resultant dispersion liquid was 10 nm.

Acrylic Resin Particles O

A dispersion liquid containing acrylic resin particles O and having a solid content concentration of 10% was obtained in the same manner as in the case of the acrylic resin particles A described in the foregoing except that the number of revolutions of the stirring was changed to 50 rpm. The average particle diameter of the acrylic resin particles O in the resultant dispersion liquid was 300 nm.

Acrylic Resin Particles P

A dispersion liquid containing acrylic resin particles P and having a solid content concentration of 10% was obtained in the same manner as in the case of the acrylic resin particles A described in the foregoing except that "50 g of styrene and 50 g of ethyl acrylate" were used as predetermined monomers. The average particle diameter of the acrylic resin particles P in the resultant dispersion liquid was 80 nm.

Acrylic Resin Particles Q

A dispersion liquid containing acrylic resin particles Q and having a solid content concentration of 10% was obtained in the same manner as in the case of the acrylic resin particles A described in the foregoing except that "45 g of styrene and 50 g of ethyl acrylate" were used as the predetermined monomers. The average particle diameter of the acrylic resin particles Q in the resultant dispersion liquid was 80 nm.

Acrylic Resin Particles R

A dispersion liquid containing acrylic resin particles R and having a solid content concentration of 10% was obtained in the same manner as in the case of the acrylic resin particles A described in the foregoing except that "50 g of styrene, 40 g of ethyl acrylate, and 10 g of acrylic acid" were used as predetermined monomers. The average particle diameter of the acrylic resin particles R in the resultant dispersion liquid was 80 nm.

Acrylic Resin Particles S

A product available under the trade name "Joncryl 711" from BASF was used as acrylic resin particles S. The average particle diameter of the acrylic resin particles S was 90 nm.

<Preparation of Water-Soluble Acrylic Resin>

Water-Soluble Acrylic Resin T

A sodium polyethylacrylate (molecular weight: 500,000) was used in the state of an aqueous solution as a water-soluble acrylic resin T.

The summary of details about the acrylic resin particles and the water-soluble acrylic resin is shown in Table 1.

TABLE 1

|  | Monomer (g) | | | | | | Content of constituent unit derived from ester-bond-containing monomer (mol %) |
| --- | --- | --- | --- | --- | --- | --- | --- |
|  | Ethyl acrylate | Ethyl methacrylate | n-Butyl acrylate | Acrylic acid | Methacrylic acid | Styrene |  |
| Acrylic resin particles A | 100 |  |  |  |  |  | 100 |
| Acrylic resin particles B | 80 |  |  |  |  | 20 | 81 |
| Acrylic resin particles C | 60 |  |  | 14 |  | 20 | 61 |
| Acrylic resin particles D |  | 100 |  |  |  |  | 100 |
| Acrylic resin particles E |  |  | 57 |  |  | 10 | 82 |
| Acrylic resin particles F |  |  | 85 |  | 17 | 20 | 63 |
| Acrylic resin particles G | 90 |  | 14 |  |  |  | 100 |
| Acrylic resin particles H | 40 |  | 60 |  |  |  | 100 |
| Acrylic resin particles I | 8 |  | 90 |  |  |  | 100 |
| Acrylic resin particles J | 30 |  | 35 |  |  | 12 | 83 |
| Acrylic resin particles K | 40 |  | 50 | 10 |  | 10 | 77 |
| Acrylic resin particles M |  |  |  |  |  |  | 100 |
| Acrylic resin particles N | 100 |  |  |  |  |  | 100 |
| Acrylic resin particles O | 100 |  |  |  |  |  | 100 |
| Acrylic resin particles P | 50 |  |  |  |  | 50 | 51 |
| Acrylic resin particles Q |  | 50 |  |  |  | 45 | 50 |
| Acrylic resin particles R | 50 |  |  | 10 |  | 40 | 49 |
| Acrylic resin particles S |  |  |  | — |  |  | 58 |
| Water-soluble acrylic resin T |  |  |  | — |  |  | 0 |

<Preparation of Ink>

Respective components were mixed so as to have amounts (%) shown in Tables 2-1 and 2-2. Water was added so that the total amount became 100%. The mixture was sufficiently stirred to be dispersed, and was then filtered with a glass filter (trade name: "AP20", manufactured by Merck Millipore Corporation). Thus, respective inks (yellow inks 1 to 50, a cyan ink 1, a magenta ink 1, a black ink 1, and a red ink 1) were prepared. The "amount (%) of a self-dispersible pigment" and the "amount (%) of acrylic resin particles" in Tables 2-1 and 2-2 mean the "amount (%) of the solid content of the pigment" and the "amount (%) of the solid content of the acrylic resin particles" in an ink, respectively. Abbreviations in Tables 2-1 and 2-2 are as described below.

Self-Dispersible Pigment

"COJ470Y": trade name: "CAB-O-JET 470Y" (manufactured by Cabot, a self-dispersible pigment having a phosphonic acid group bonded directly or via another atomic group to the surface of a pigment particle)
"COJ450C": trade name: "CAB-O-JET 450C" (manufactured by Cabot, a self-dispersible pigment having a phosphonic acid group bonded directly or via another atomic group to the surface of a pigment particle)
"COJ465M": trade name: "CAB-O-JET 465M" (manufactured by Cabot, a self-dispersible pigment having a phosphonic acid group bonded directly or via another atomic group to the surface of a pigment particle)
"COJ400": trade name: "CAB-O-JET 400" (manufactured by Cabot, a self-dispersible pigment having a phosphonic acid group bonded directly or via another atomic group to the surface of a pigment particle)
"COJ480V": trade name: "CAB-O-JET 480V" (manufactured by Cabot, a self-dispersible pigment having a phosphonic acid group bonded directly or via another atomic group to the surface of a pigment particle)
"COJ200Y": trade name: "CAB-O-JET 200Y" (manufactured by Cabot, a self-dispersible pigment having a sulfonic acid group bonded to the surface of a pigment particle)

Resin-Dispersed Pigment

Trade name: "Solsperse-27000" (manufactured by The Lubrizol Corporation)

Surfactant

"AE40": trade name: "ACETYLENOL E40" (manufactured by Kawaken Fine Chemicals Co., Ltd.)
"AE60": trade name: "ACETYLENOL E60" (manufactured by Kawaken Fine Chemicals Co., Ltd.)
"AE100": trade name: "ACETYLENOL E100" (manufactured by Kawaken Fine Chemicals Co., Ltd.)
"S440": trade name: "Surfynol 440" (manufactured by Nissin Chemical Co., Ltd.)
"D604": trade name: "Dynol 604" (manufactured by Air Products and Chemicals, Inc.)
"D607": trade name: "Dynol 607" (manufactured by Air Products and Chemicals, Inc.)
"D800": trade name: "Dynol 800" (manufactured by Air Products and Chemicals, Inc.)
"D810": trade name: "Dynol 810" (manufactured by Air Products and Chemicals, Inc.)
"E104P": trade name: "EMULGEN 104P" (manufactured by Kao Corporation)

Water-Soluble Organic Solvent

"Gly": glycerin
"EG": ethylene glycol
"DEG": diethylene glycol
"TEG": triethylene glycol
"2-Py": 2-pyrrolidone
"PEG400": polyethylene glycol (number-average molecular weight: 400)
"PEG1000": polyethylene glycol (number-average molecular weight: 1,000)

TABLE 2-1

| | | Composition of ink | | | | | | | | | | | |
|---|---|---|---|---|---|---|---|---|---|---|---|---|---|
| | | Self-dispersible pigment | | Surfactant | | Acrylic resin particles | | Water-soluble organic solvent (%) | | | | | |
| | Ink | Kind | Amount (%) | Kind | Amount (%) | Kind | Amount (%) | Gly | EG | DEG | TEG | 2-Py | PEG 400 | PEG 1000 |
| Example 1 | Yellow ink 1 | Pigment A | 5 | D800 | 1 | A | 5 | 15 | 0 | 0 | 0 | 0 | 0 | 5 |
| Example 2 | Yellow ink 2 | Pigment A | 5 | D800 | 1 | B | 5 | 15 | 0 | 0 | 0 | 0 | 0 | 5 |
| Example 3 | Yellow ink 3 | Pigment A | 5 | D800 | 1 | C | 5 | 15 | 0 | 0 | 0 | 0 | 0 | 5 |
| Example 4 | Yellow ink 4 | Pigment A | 5 | D800 | 1 | D | 5 | 15 | 0 | 0 | 0 | 0 | 0 | 5 |
| Example 5 | Yellow ink 5 | Pigment A | 5 | D800 | 1 | E | 5 | 15 | 0 | 0 | 0 | 0 | 0 | 5 |
| Example 6 | Yellow ink 6 | Pigment A | 5 | D800 | 1 | F | 5 | 15 | 0 | 0 | 0 | 0 | 0 | 5 |
| Example 7 | Yellow ink 7 | Pigment A | 5 | D800 | 1 | G | 5 | 15 | 0 | 0 | 0 | 0 | 0 | 5 |
| Example 8 | Yellow ink 8 | Pigment A | 5 | D800 | 1 | H | 5 | 15 | 0 | 0 | 0 | 0 | 0 | 5 |
| Example 9 | Yellow ink 9 | Pigment A | 5 | D800 | 1 | I | 5 | 15 | 0 | 0 | 0 | 0 | 0 | 5 |
| Example 10 | Yellow ink 10 | Pigment A | 5 | D800 | 1 | J | 5 | 15 | 0 | 0 | 0 | 0 | 0 | 5 |
| Example 11 | Yellow ink 11 | Pigment A | 5 | D800 | 1 | K | 5 | 15 | 0 | 0 | 0 | 0 | 0 | 5 |
| Example 12 | Yellow ink 12 | Pigment A | 5 | D800 | 1 | L | 5 | 15 | 0 | 0 | 0 | 0 | 0 | 5 |
| Example 13 | Yellow ink 13 | Pigment A | 5 | D800 | 1 | M | 5 | 15 | 0 | 0 | 0 | 0 | 0 | 5 |
| Example 14 | Yellow ink 14 | Pigment A | 5 | D800 | 1 | N | 5 | 15 | 0 | 0 | 0 | 0 | 0 | 5 |
| Example 15 | Yellow ink 15 | Pigment A | 5 | D800 | 1 | O | 5 | 15 | 0 | 0 | 0 | 0 | 0 | 5 |
| Example 16 | Yellow ink 16 | COJ470Y | 5 | D800 | 1 | G | 5 | 15 | 0 | 0 | 0 | 0 | 0 | 5 |
| Example 17 | Cyan ink 1 | COJ450C | 5 | D800 | 1 | G | 5 | 15 | 0 | 0 | 0 | 0 | 0 | 5 |
| Example 18 | Magenta ink 1 | COJ465M | 5 | D800 | 1 | G | 5 | 15 | 0 | 0 | 0 | 0 | 0 | 5 |
| Example 19 | Black ink 1 | COJ400K | 5 | D800 | 1 | G | 5 | 15 | 0 | 0 | 0 | 0 | 0 | 5 |
| Example 20 | Red ink 1 | COJ480V | 5 | D800 | 1 | G | 5 | 15 | 0 | 0 | 0 | 0 | 0 | 5 |
| Example 21 | Yellow ink 17 | Pigment B | 5 | D800 | 1 | G | 5 | 15 | 0 | 0 | 0 | 0 | 0 | 5 |
| Example 22 | Yellow ink 18 | Pigment A | 5 | D800 | 3 | G | 5 | 15 | 0 | 0 | 0 | 0 | 0 | 5 |
| Example 23 | Yellow ink 19 | Pigment A | 5 | D800 | 0.5 | G | 5 | 15 | 0 | 0 | 0 | 0 | 0 | 5 |
| Example 24 | Yellow ink 20 | Pigment A | 5 | D800 | 0.05 | G | 5 | 15 | 0 | 0 | 0 | 0 | 0 | 5 |
| Example 25 | Yellow ink 21 | Pigment A | 5 | D800 | 3.2 | G | 5 | 15 | 0 | 0 | 0 | 0 | 0 | 5 |
| Example 26 | Yellow ink 22 | Pigment A | 5 | AE40 | 1 | G | 5 | 15 | 0 | 0 | 0 | 0 | 0 | 5 |
| Example 27 | Yellow ink 23 | Pigment A | 5 | AE60 | 1 | G | 5 | 15 | 0 | 0 | 0 | 0 | 0 | 5 |
| Example 28 | Yellow ink 24 | Pigment A | 5 | AE100 | 1 | G | 5 | 15 | 0 | 0 | 0 | 0 | 0 | 5 |

TABLE 2-2

| | | Composition of ink | | | | | | | | | | | |
|---|---|---|---|---|---|---|---|---|---|---|---|---|---|
| | | Self-dispersible pigment | | Surfactant | | Acrylic resin particles | | Water-soluble organic solvent (%) | | | | | |
| | Ink | Kind | Amount (%) | Kind | Amount (%) | Kind | Amount (%) | Gly | EG | DEG | TEG | 2-Py | PEG 400 | PEG 1000 |
| Example 29 | Yellow ink 25 | Pigment A | 5 | S440 | 1 | G | 5 | 15 | 0 | 0 | 0 | 0 | 0 | 5 |
| Example 30 | Yellow ink 26 | Pigment A | 5 | D604 | 1 | G | 5 | 15 | 0 | 0 | 0 | 0 | 0 | 5 |
| Example 31 | Yellow ink 27 | Pigment A | 5 | D607 | 1 | G | 5 | 15 | 0 | 0 | 0 | 0 | 0 | 5 |
| Example 32 | Yellow ink 28 | Pigment A | 5 | D810 | 1 | G | 5 | 15 | 0 | 0 | 0 | 0 | 0 | 5 |
| Example 33 | Yellow ink 29 | Pigment A | 5 | E104P | 1 | G | 5 | 15 | 0 | 0 | 0 | 0 | 0 | 5 |
| Example 34 | Yellow ink 30 | Pigment A | 5 | D800 | 1 | G | 5 | 25 | 0 | 0 | 0 | 0 | 0 | 0 |
| Example 35 | Yellow ink 31 | Pigment A | 5 | D800 | 1 | G | 5 | 0 | 20 | 0 | 0 | 0 | 0 | 0 |
| Example 36 | Yellow ink 32 | Pigment A | 5 | D800 | 1 | G | 5 | 0 | 0 | 20 | 0 | 0 | 0 | 0 |
| Example 37 | Yellow ink 33 | Pigment A | 5 | D800 | 1 | G | 5 | 15 | 5 | 0 | 0 | 0 | 0 | 0 |
| Example 38 | Yellow ink 34 | Pigment A | 5 | D800 | 1 | G | 5 | 15 | 0 | 5 | 0 | 0 | 0 | 0 |
| Example 39 | Yellow ink 35 | Pigment A | 5 | D800 | 1 | G | 5 | 15 | 0 | 0 | 5 | 0 | 0 | 0 |
| Example 40 | Yellow ink 36 | Pigment A | 5 | D800 | 1 | G | 5 | 15 | 0 | 0 | 0 | 5 | 0 | 0 |
| Example 41 | Yellow ink 37 | Pigment A | 5 | D800 | 1 | G | 5 | 10 | 5 | 0 | 0 | 0 | 0 | 5 |
| Example 42 | Yellow ink 38 | Pigment A | 5 | D800 | 1 | G | 5 | 10 | 0 | 5 | 0 | 0 | 0 | 5 |
| Example 43 | Yellow ink 39 | Pigment A | 5 | D800 | 1 | G | 5 | 10 | 0 | 0 | 5 | 0 | 0 | 5 |
| Example 44 | Yellow ink 40 | Pigment A | 5 | D800 | 1 | G | 5 | 15 | 0 | 0 | 0 | 0 | 5 | 0 |
| Comparative Example 1 | Yellow ink 41 | Pigment A | 5 | D800 | 1 | P | 5 | 15 | 0 | 0 | 0 | 0 | 0 | 5 |
| Comparative Example 2 | Yellow ink 42 | Pigment A | 5 | D800 | 1 | Q | 5 | 15 | 0 | 0 | 0 | 0 | 0 | 5 |
| Comparative Example 3 | Yellow ink 43 | Pigment A | 5 | D800 | 1 | R | 5 | 15 | 0 | 0 | 0 | 0 | 0 | 5 |
| Comparative Example 4 | Yellow ink 44 | Pigment A | 5 | D800 | 1 | S | 5 | 15 | 0 | 0 | 0 | 0 | 0 | 5 |
| Comparative Example 5 | Yellow ink 45 | Pigment A | 5 | D800 | 1 | T | 5 | 15 | 0 | 0 | 0 | 0 | 0 | 5 |
| Comparative Example 6 | Yellow ink 46 | Pigment A | 5 | D800 | 1 | — | 0 | 15 | 0 | 0 | 0 | 0 | 0 | 5 |
| Comparative Example 7 | Yellow ink 47 | COJ200Y | 5 | D800 | 1 | G | 5 | 15 | 0 | 0 | 0 | 0 | 0 | 5 |

TABLE 2-2-continued

| | | Composition of ink | | | | | | | | | | | |
|---|---|---|---|---|---|---|---|---|---|---|---|---|---|
| | | Self-dispersible pigment | | Surfactant | | Acrylic resin particles | | Water-soluble organic solvent (%) | | | | | |
| | Ink | Kind | Amount (%) | Kind | Amount (%) | Kind | Amount (%) | Gly | EG | DEG | TEG | 2-Py | PEG 400 | PEG 1000 |
| Comparative Example 8 | Yellow ink 48 | COJ200Y | 5 | D800 | 1 | G | 5 | 15 | 0 | 0 | 0 | 0 | 0 | 5 |
| Comparative Example 9 | Yellow ink 49 | COJ200Y | 5 | D800 | 1 | G | 5 | 15 | 0 | 0 | 0 | 0 | 0 | 5 |
| Comparative Example 10 | Yellow ink 50 | Resin-dispersed pigment | 5 | D800 | 1 | G | 5 | 15 | 0 | 0 | 0 | 0 | 0 | 5 |

<Evaluation>

An image was recorded on a recording medium with an inkjet recording apparatus having a construction illustrated in FIG. 1, the apparatus being mounted with a piezo type inkjet head (trade name "KJ4", manufactured by Kyocera Corporation, nozzle density: 600 dpi). The recording was performed under the conditions of a temperature of 25° C.; a relative humidity of 55%; an ink ejection frequency of 39 kHz; a conveying speed of the recording medium of 100 m/min; and an ink ejection volume at the time of the recording of about 13 pL per dot. In the inkjet recording apparatus, the condition under which one dot of an ink droplet having a mass of 13 ng is applied to a unit region measuring 1/600 inch by 1/600 inch at a resolution of 600 dpi×600 dpi is defined as a recording duty of 100%.

Color Developability of Image (Before High-Temperature Storage)

A solid image having a size measuring 3 cm by 3 cm (recording duty: 100%) was recorded on a recording medium (trade name: "DL 9084", manufactured by Mitsubishi Paper Mills Limited, basis weight: 91 g/m$^2$) with the inkjet recording apparatus. The optical density of the recorded image was measured with a reflection densitometer (trade name "RD-19I", manufactured by Gretag Macbeth), and the color developability of the image (before high-temperature storage) was evaluated in accordance with the following evaluation criteria. The results of the evaluation are shown in Tables 3-1 and 3-2. In the following evaluation criteria, the levels "A" and "B" were defined as preferred levels, and the level "C" was defined as an unacceptable level.

A: The optical density was 1.3 or more.
B: The optical density was 1.2 or more to less than 1.3.
C: The optical density was less than 1.2.

Color Developability of Image (after High-Temperature Storage)

An ink immediately after its preparation (ink before high-temperature storage), and an ink stored in a closed space at 60° C. for 2 weeks and then returned to room temperature (ink after high-temperature storage) were provided. A solid image having a size measuring 3 cm by 3 cm (recording duty: 100%) was recorded on a recording medium (trade name: "DL 9084", manufactured by Mitsubishi Paper Mills Limited, basis weight: 91 g/m$^2$) by using the inkjet recording apparatus and each of the two kinds of inks. The Lab values of the recorded image were measured with a spectrophotometer (trade name "i1 Publish Pro2", manufactured by X-Rite), and a color difference ΔE between the image recorded with the ink before high-temperature storage and the image recorded with the ink after high-temperature storage was calculated from the following equation (2).

$$\Delta E = ((L_{before\ storage} - L_{after\ storage})^2 + (a_{before\ storage} - a_{after\ storage})^2 + (b_{before\ storage} - b_{after\ storage})^2)^{1/2} \quad (2)$$

Then, the color developability of the image (after high-temperature storage) was evaluated in accordance with the following evaluation criteria. The results of the evaluation are shown in Tables 3-1 and 3-2. In the following evaluation criteria, the levels "A" and "B" were defined as preferred levels, and the level "C" was defined as an unacceptable level.

A: The color difference ΔE was less than 2.
B: The color difference ΔE was 2 or more to less than 3.
C: The color difference ΔE was 3 or more.

Rubfastness of Image

An image in which three lines having a width of 3 mm and one line having a width of 17 mm (each of the lines had a recording duty of 100%) were arrayed so as to be parallel to one another was recorded on a recording medium (trade name: "DL 9084", manufactured by Mitsubishi Paper Mills Limited, basis weight: 91 g/m$^2$) with the inkjet recording apparatus. Paper (trade name: "OK Top Coat +", manufactured by Oji Paper Co., Ltd., basis weight: 105 g/m$^2$) was overlaid on the image within 3 minutes from the recording, and a weight of 500 g was further placed thereon so as to have a contact area of 12.6 cm$^2$. Then, the following rubfastness test was performed: the resultant laminate was rubbed with the weight once so that the relative speed between the recording medium having recorded thereon the image and the paper became 10 cm/s, and the contact surface of the weight perpendicularly crossed the four lines. After that, an ink adhering to a region having an area of 12.6 cm$^2$ in the paper having placed thereon the weight was read with a scanner (trade name: "Multi-function Machine iR3245F", manufactured by Canon Inc., 600 dpi, gray scale, photograph mode). Then, the proportion of the area of a portion having a brightness of less than 128 in 256 gradations (ink adhesion area proportion) was calculated, and the rubfastness of the image was evaluated in accordance with the following evaluation criteria. The results of the evaluation are shown in Tables 3-1 and 3-2. In the following evaluation criteria, the levels "A" and "B" were defined as preferred levels, and the level "C" was defined as an unacceptable level.

A: The ink adhesion area proportion was 1% or less.
B: The ink adhesion area proportion was more than 1% and 5% or less.
C: The ink adhesion area proportion was more than 5%.

TABLE 3-1

Evaluation result

| | | Color developability | | |
|---|---|---|---|---|
| | Ink | Before high-temperature storage | After high-temperature storage | Rubfastness |
| Example 1 | Yellow ink 1 | A | A | A |
| Example 2 | Yellow ink 2 | A | A | A |
| Example 3 | Yellow ink 3 | A | A | A |
| Example 4 | Yellow ink 4 | A | A | A |
| Example 5 | Yellow ink 5 | A | A | A |
| Example 6 | Yellow ink 6 | A | A | A |
| Example 7 | Yellow ink 7 | A | A | A |
| Example 8 | Yellow ink 8 | A | A | A |
| Example 9 | Yellow ink 9 | A | A | A |
| Example 10 | Yellow ink 10 | A | A | A |
| Example 11 | Yellow ink 11 | A | A | A |
| Example 12 | Yellow ink 12 | A | A | A |
| Example 13 | Yellow ink 13 | A | A | A |
| Example 14 | Yellow ink 14 | B | A | A |
| Example 15 | Yellow ink 15 | B | A | A |
| Example 16 | Yellow ink 16 | A | A | A |
| Example 17 | Cyan ink 1 | A | A | A |
| Example 18 | Magenta ink 1 | A | A | A |
| Example 19 | Black ink 1 | A | A | A |
| Example 20 | Red ink 1 | A | A | A |
| Example 21 | Yellow ink 17 | B | A | A |
| Example 22 | Yellow ink 18 | A | A | A |
| Example 23 | Yellow ink 19 | A | A | A |
| Example 24 | Yellow ink 20 | B | A | A |
| Example 25 | Yellow ink 21 | B | A | A |
| Example 26 | Yellow ink 22 | B | A | A |
| Example 27 | Yellow ink 23 | B | A | A |
| Example 28 | Yellow ink 24 | B | A | A |

TABLE 3-2

Evaluation result

| | | Color developability | | |
|---|---|---|---|---|
| | Ink | Before high-temperature storage | After high-temperature storage | Rubfastness |
| Example 29 | Yellow ink 25 | B | A | A |
| Example 30 | Yellow ink 26 | B | A | A |
| Example 31 | Yellow ink 27 | B | A | A |
| Example 32 | Yellow ink 28 | B | A | A |
| Example 33 | Yellow ink 29 | B | A | A |
| Example 34 | Yellow ink 30 | B | A | A |
| Example 35 | Yellow ink 31 | B | A | A |
| Example 36 | Yellow ink 32 | B | A | A |
| Example 37 | Yellow ink 33 | B | A | A |
| Example 38 | Yellow ink 34 | B | A | A |
| Example 39 | Yellow ink 35 | B | A | A |
| Example 40 | Yellow ink 36 | B | A | A |
| Example 41 | Yellow ink 37 | A | A | A |
| Example 42 | Yellow ink 38 | A | A | A |
| Example 43 | Yellow ink 39 | A | A | A |
| Example 44 | Yellow ink 40 | A | A | A |
| Comparative Example 1 | Yellow ink 41 | A | C | A |
| Comparative Example 2 | Yellow ink 42 | A | C | A |
| Comparative Example 3 | Yellow ink 43 | A | C | A |
| Comparative Example 4 | Yellow ink 44 | A | C | A |
| Comparative Example 5 | Yellow ink 45 | C | B | A |
| Comparative Example 6 | Yellow ink 46 | A | C | C |
| Comparative Example 7 | Yellow ink 47 | C | B | A |
| Comparative Example 8 | Yellow ink 48 | C | B | A |
| Comparative Example 9 | Yellow ink 49 | C | B | A |
| Comparative Example 10 | Yellow ink 50 | C | B | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-010898, filed Jan. 22, 2016, which is hereby incorporated by reference herein in its entirety.

What is claimed is:

1. An ink comprising a self-dispersible pigment, acrylic resin particles, a water-soluble organic solvent, and water, wherein:
   the self-dispersible pigment comprises a phosphonic-acid-based self-dispersible pigment having a phosphonic acid group bonded directly or via another atomic group to a surface of particles of the pigment;
   the acrylic resin particles are formed of an acrylic resin containing a constituent unit derived from an ester-bond-containing monomer;
   a content of the constituent unit derived from the ester-bond-containing monomer in the acrylic resin is 60 mol % or more based on a total of the acrylic resin; and
   the water-soluble organic solvent comprises a polyethylene glycol having a number-average molecular weight of 500 or more to 1,200 or less.

2. The ink according to claim 1, wherein the acrylic resin particles have an average particle diameter of 10 nm or more to 200 nm or less.

3. The ink according to claim 1, wherein the ester-bond-containing monomer comprises at least one of an acrylic acid ester or a methacrylic acid ester.

4. The ink according to claim 1, wherein the phosphonic acid group comprises a bisphosphonic acid group.

5. The ink according to claim 1, further comprising a surfactant, wherein a content (mass %) of the surfactant is 0.1 mass % or more to 3.0 mass % or less based on a total mass of the ink.

6. The ink according to claim 5, wherein the surfactant comprises a surfactant represented by the following general formula (1):

wherein R1 to R4 each independently represent an alkyl group having 1 to 3 carbon atoms; x and y each independently represent a number of from 1 to 5; and m+n represents a number of from 0 to 10.

7. The ink according to claim 6, wherein in the general formula (1), x=y=2.

8. The ink according to claim 1, wherein the water-soluble organic solvent further comprises glycerin.

9. An ink cartridge, comprising an ink and an ink storage portion configured to store the ink, wherein the ink comprises the ink of claim 1.

10. An image recording method, comprising an ink-applying step of applying an ink to a recording medium, wherein the ink comprises the ink of claim 1.

11. The ink according to claim 1, wherein the phosphonic acid group has a structure represented by $-CH(PO_3M_2)_2$.

12. The ink according to claim 8, wherein a mass ratio of a content (mass %) of the polyethylene glycol and a content (mass %) of the glycerin is 0.15 times or more to 0.40 times or less.

13. The ink according to claim 1, wherein the acrylic resin particles have an average particle diameter of 10 nm or more to 80 nm or less.

14. The ink according to claim 1, wherein the content of the constituent unit derived from the ester-bond-containing monomer in the acrylic resin is 100 mol % based on a total of the acrylic resin.

* * * * *